United States Patent  
Basturk

(10) Patent No.: US 6,903,784 B1  
(45) Date of Patent: Jun. 7, 2005

(54) DISPLAY ASSEMBLY WITH CONTRAST INVERSION INCLUDING TWO SUPERPOSED DISPLAY DEVICES

(75) Inventor: Naci Basturk, Enges (CH)

(73) Assignee: Asulab S.A., Bienne (CH)

( * ) Notice: Subject to any disclaimer, the term of this patent is extended or adjusted under 35 U.S.C. 154(b) by 228 days.

(21) Appl. No.: 09/783,286

(22) Filed: Feb. 15, 2001

(30) Foreign Application Priority Data

Feb. 22, 2000 (CH) ................................................ 0343/00

(51) Int. Cl.⁷ ......................... G02F 1/13; G02F 1/133; G02F 1/347; G04C 17/00
(52) U.S. Cl. .............................. 349/2; 349/73; 349/74; 368/30; 368/242; 368/327
(58) Field of Search .............................. 349/2, 73, 74; 368/30, 242, 327

(56) References Cited

U.S. PATENT DOCUMENTS

| 4,104,627 | A |   | 8/1978  | Thuler |
|-----------|---|---|---------|--------|
| 4,488,818 | A | * | 12/1984 | Saurer et al. ................. 368/71 |
| 5,726,723 | A | * | 3/1998  | Wang et al. .................. 349/75 |
| 5,740,130 | A | * | 4/1998  | Grupp et al. ................. 368/82 |
| 5,801,796 | A | * | 9/1998  | Lowe ............................ 349/73 |
| 6,147,934 | A | * | 11/2000 | Arikawa et al. .............. 368/84 |
| 6,185,161 | B1 | * | 2/2001 | Arikawa et al. .............. 368/84 |
| 6,229,767 | B1 | * | 5/2001 | Miyazawa et al. .......... 368/205 |
| 6,292,439 | B1 | * | 9/2001 | Akiba et al. .................. 368/84 |
| 6,414,910 | B1 | * | 7/2002 | Kaneko et al. ............. 368/242 |
| 6,587,083 | B1 | * | 7/2003 | Basturk ......................... 345/4 |
| 2002/0027833 | A1 | * | 3/2002 | Bastrik ....................... 368/84 |
| 2002/0036955 | A1 | * | 3/2002 | Basturk ....................... 368/223 |
| 2002/0048221 | A1 | * | 4/2002 | Basturk ........................ 368/84 |
| 2002/0071347 | A1 | * | 6/2002 | Gilomen ...................... 368/82 |

FOREIGN PATENT DOCUMENTS

| EP | 0926574   | * | 6/1999 | ............ G04G/9/00 |
| EP | 0 926 574 A |  | 6/1999 |  |
| EP | 0 930 522 A |  | 7/1999 |  |
| EP | 0930522   | * | 7/1999 | ......... G02F/1/1335 |
| JP | 57-074723 A |  | 5/1982 |  |

* cited by examiner

Primary Examiner—Tarifur R. Chowdhury  
Assistant Examiner—Mike Qi  
(74) Attorney, Agent, or Firm—Griffin & Szipl, P.C.

(57) ABSTRACT

A second device (24) is mounted on a first device (22) formed of a liquid crystal (27) display cell (26) at the front of which is arranged a first linear polarizer (40), of a liquid crystal (29) optical valve (28) at the back of which is arranged a second polarizer (44) and means (23) for controlling the valve (28) and the cell (26) from a switched state to a non switched state. When the cell (26) is switched to display a data item, by associating a first light or dark device (22) with a second absorbent or reflective polarizer (44), an inversion of the contrast in said data is obtained by switching the valve (28).

12 Claims, 8 Drawing Sheets

DISPLAY ASSEMBLY WITH CONTRAST INVERSION INCLUDING TWO SUPERPOSED DISPLAY DEVICES

FIELD OF THE INVENTION

The present invention concerns a display assembly including two superposed display devices, a first display device farthest from the observer being surmounted by a second display device formed by a liquid crystal cell assembly and polarisers including control means to make visible either solely the information given by the second display device offering the possibility of inverting the contrast of all or part of said information, or the information given by the first display device.

BACKGROUND OF THE INVENTION

The invention also concerns a timepiece provided with such a display assembly wherein the first display device is formed for example by the dial of the timepiece and the second display device is arranged between the crystal and the dial or merged with the crystal. The invention concerns more particularly such a timepiece wherein the dial cooperates with an analogue display.

According to another aspect of the invention, the information given by the first display device is permanently visible and that given by the second display device can be requested on demand to appear in a light colour on a dark background or conversely in a dark colour on a light background.

A display assembly including two superposed display devices able to take two different states wherein one of the display devices is visible to the exclusion of the other, is already known from European Patent No. 0 926 574 in the name of the Applicant. Such a display assembly in its application to a wristwatch is schematically shown in a diametral cross-section in FIG. 1, the operating principle being given by FIGS. 2A and 2B.

The watch shown in FIG. 1A, designated by the general reference 1, includes, in a conventional manner, a middle part 2, a back cover 3 and a crystal 20 together delimiting a case in the bottom part of which is arranged an electronic clockwork movement 4 powered by a battery 5. Movement 4 includes an electronic time-keeping circuit associated with a drive device (not shown), hour, minute and second hands 12, 14 and 16 moving above a dial 18 bearing hour symbols (not shown).

Hands 12, 14 and 16 and dial 18 constitute the first display device, which is of the analogue type in the example illustrated, and designated by the general reference 22.

This wristwatch 1 further includes a second display device of the digital type, designated by the general reference 24 and arranged between dial 18 and crystal 20. With reference again to FIGS. 2A and 2B, it can be seen that second display device 24 is formed of a sandwich type structure including, moving from crystal 20 to dial 18, an absorbent linear polariser 40, a liquid crystal display cell 26, an absorbent linear polariser 42 crossed with polariser 40, a liquid crystal optical valve 28 and a reflective polariser 44 crossed with polariser 42. The switching states of the cell and the valve of the second display device are controlled by a control unit 23 as a function of manipulations effected by means of at least one external control member 9.

Display cell 26 includes, in a conventional manner, a transparent front substrate 30, a back substrate 32 which is also transparent, and a sealing frame 34 forming spacing and closing means delimiting with substrates 30 and 32 a closed cavity containing liquid crystals 27. The opposite faces of substrates 30 and 32 include transparent electrodes respectively 36 and 38 made for example of ITO. In the example illustrated, back electrode 38 extends over the entire surface of substrate 32 and front electrode 36 is configured in segments or digits which can be addressed separately by means of control unit 23, the activated (ON) or non activated (OFF) state being symbolised by the contactor 6 in the diagram of FIG. 2A and in the following diagrams. This cell 26 thus allows alphanumerical characters to be displayed by causing liquid crystals 27 to switch from a transparent state to an absorbent state, or vice versa depending upon the type of liquid crystals used. As will be understood hereinafter, in the application to a wristwatch where energy saving is of great importance, it will be preferable to use liquid crystals which give the cell a transparent state when no voltage is applied and an absorbent state when a voltage is applied.

Optical valve 28, containing liquid crystals 29 and having a contactor 8, has a comparable structure to that of cell 26 and differs from it only in that the two transparent electrodes totally cover the opposite faces of top substrate 31 and bottom substrate 33, so that valve 28 can switch from a totally transparent state to a totally absorbent state, or vice versa depending upon the type of liquid crystals used. For the reason indicated hereinbefore, liquid crystals 29 will preferably be selected to have a transparent state in the absence of voltage.

European Patent No. 0 926 574 only envisages two different operating states for the display assembly, as explained briefly with reference to FIGS. 2A and 2B annexed to the present patent application. Liquid crystals 27 and 29 which are respectively in cell 26 and valve 28 are of the positive anisotropy twisted nematic type.

In a first state shown in FIG. 2A, in which cell 26 and valve 28 are not switched (OFF-OFF state), the natural non polarised light 46 is polarised vertically by first absorbent polariser 40 and designated by the general reference 48. Passing through cell 26, the axis of polarisation undergoes a rotation of 90°, so that the light passes through crossed polariser 42 without being modified. Passing then through valve 28, the axis of polarisation undergoes another rotation of 90° so that the polarised light passes through reflective polariser 44 without being modified to reach ial 18 forming first display device 22.

The light follows the same path during its return travel, so that dial 18 is visible to an observer 50 placed in front of the display assembly.

In a second state shown in FIG. 2B, the segments or digits 36 of the cell 26 are switched (ON state), and valve 28 is also switched (ON state) over the entire surface so that the vertically polarised light emerging from absorbent polariser 40 will have two different types of behaviour. In the zone in which cell 26 is not switched the polarised light follows the same path as previously as far as valve 28 which it passes through without undergoing another rotation so that, since its axis of polarisation is perpendicular to that of reflective polariser 44, it is totally reflected on its return travel concealing dial 18 from observer 50. In the zone of cell 26 in which segments 26 are addressed, the vertically polarised light 48 passes through cell 26 without modification, so that since its axis of polarisation is perpendicular to that of absorbent polariser 42, it is totally absorbed, the addressed segments appearing then in a dark colour on the light background.

According to a second embodiment described in European Patent No. 0926 574, the same visual effect is obtained with liquid crystals of the negative anisotropy twisted nematic type with a construction in which the three polarisers are parallel.

As can be seen, whatever the positive or negative anisotropy of the twisted nematic liquid crystals, the passage from an OFF-OFF switching configuration to an ON-ON switching configuration does not allow an inversion of the contrast to be obtained. In a known manner, such a contrast inversion could be obtained by means of inverse addressing, but at the cost of a demand for energy nine times greater than that which is necessary to address only 1/10 of the useful segments for the display, a solution which is unsatisfactory in a system where energy saving is of great importance.

Likewise, according to the teaching of the prior art, one could hope to obtain an inversion of the contrast by rotating a polariser by 90°, which would obviously cause great complication as regards a mechanical or manual drive system, especially for a display assembly of small dimensions, such as that able to be incorporated in a wristwatch.

In order to try to obtain an inversion of the contrast, it also seems natural, to avoid the aforementioned drawbacks, to examine the effect obtained with the device which has just been described by using a third switching possibility, namely the cell in the ON state and the valve in the OFF state, as shown in FIG. 2C. Outside the switching zones of the segments of cell 26, the polarised light passes through valve 28 undergoing another rotation of 90°, so that it is polarised parallel to reflective polariser 44 through which it passes to be returned by the dial through an identical return path to observer. The second display is then shown in dark on the background of the dial, which must then necessarily be a light colour, but does not undergo any contrast inversion.

The second embodiment of European Patent No. 0 926 574 suggests acting on the relative orientation of the three polarisers. The appearances which it would be possible to observe with TN liquid crystals with positive anisotropy, for the two switching configurations able to generate an inversion of the contrast are summarized in the following table recalling those observed in FIGS. 2B and 2C.

| Arrangement of polarisers | | | State | | Display(s) able to be observed | Aspect according to |
|---|---|---|---|---|---|---|
| P40 | P42 | P44 | C26 | V28 | of 2nd display | FIG. No. |
| P ⊥ | P ⊥ | P | ON | ON | 2nd D/L [P44] | 2B |
|  |  |  | ON | OFF | 1st et 2nd D/L, if dial light | 2C |
| P // | P // | P | ON | ON | 1st et 2nd L/D, if dial light | 3A |
|  |  |  | ON | OFF | 2nd L/D [P42] | 3B |
| P // | P ⊥ | P | ON | ON | 2nd L [P44]/D [P42] | 4A |
|  |  |  | ON | OFF | 2nd L/D [P42], if dial light | 4B |
| P ⊥ | P // | P | ON | ON | 1st et 2nd D/L, if dial light | 5A |
|  |  |  | ON | OFF | 2nd D/L [P44] | 5B |

Key:
⊥ crossed polarisers; // parallel polarisers
L/D light colour on dark background;
D/L dark colour on light background The assembly shown in FIGS. 3A and 3B differs from the aforecited prior art in that the intermediate absorbent polariser 42 was rotated by 90° so that the three polarisers have parallel axes of polarisation. This configuration allows a second display in a light colour on a dark background to be obtained whatever the ON-ON or OFF-OFF switching state, i.e. reversed with respect to the preceding example, but without inversion for the display assembly as such when one passes from one switching state to another. In the assembly shown in FIGS. 4A and 4B, back reflective polariser 44 has also been made to undergo a rotation of 90° and it can be seen that the same visual effect as before is obtained, only with an inversion of the switching configuration. By making intermediate polariser 42 undergo a rotation of 90° as shown in FIGS. 5A and 5B, one returns to the visual aspect of FIGS. 2A and 2B, again without obtaining an inversion of the contrast over the same display assembly.

The object of the present invention is thus to overcome the drawbacks of this prior art by providing a display assembly including two superposed display devices, allowing an inversion of the contrast to be obtained in one of the displays without increasing the energy requirement and without requiring a complex polariser drive mechanism.

SUMMARY OF THE INVENTION

The invention therefore concerns a display assembly with two superposed contrast inversion display devices including a first display device, a second active display device having a double structure, one structure being formed by a liquid crystal dot matrix display cell or by a digit liquid crystal display cell, said liquid crystals being confined in a space delimited by two transparent substrates and having two switching states (ON/OFF), and the other structure being formed by a liquid crystal optical valve, said liquid crystals being confined in a space delimited by two transparent substrates and having at least two switching states (ON-OFF), and control means allowing an appropriate voltage to be selectively applied to the cell and/or to all or part of the valve to cause them to switch from one state to another. This assembly is characterised in that a first polariser is arranged at the front of the display cell and in that a second polariser is arranged at the back of the valve so that, when the cell is switched (ON) to display at least one item of data, the total or partial switching of the valve, from one state to another, inverts the contrast of the data displayed from a light appearance to a dark appearance or vice versa, as a function of the light or dark shade of the first display device, and of the absorbent or reflective nature of the polariser, placed at the back of the second display device.

When the cell is not switched (OFF state), the display assembly can also have, as a function of the switching state (ON/OFF) of the optical valve, two other different aspects. According to one aspect, the second display is invisible, and the cell and the valve are transparent to allow the observer to see only the first display device. According to another aspect, the two displays device are made invisible by a mirror mask or a black mask depending on the reflective or absorbent nature of the back polariser.

According to another aspect of the invention, the valve can include at least two distinct reverse switching zones (ON/OFF), so that two types of data of the second display can be observed with an inversion of the contrast.

According to a further aspect of the invention, if there is no polariser between the display cell and the optical valve, it is possible to construct the second display device with a transparent median substrate common to the display cell and the optical valve, thereby reducing the undesirable parallax effect.

The display assembly according to the invention thus allows a single assembly including two superposed display devices to have up to five different aspects simply by varying the switching mode of the display cell and the optical valve.

The invention also has the advantage of allowing the user to select the type of contrast best suited to the lighting of the place in which he is situated, namely a dark colour on a light background if there is not much light, or conversely a light colour on a dark background if there is a lot of light.

BRIEF DESCRIPTION OF THE DRAWINGS

Other features and advantages of the present invention will appear more clearly upon reading the following embodiments and operating modes, with reference to the annexed drawings, in which.

DESCRIPTION OF THE PREFERRED EMBODIMENTS

The following description is made by way of example within the scope of an application of the invention to a timepiece such as a wristwatch of the type shown in FIG. 1. It is to be understood that the invention is not limited to this application and that it could advantageously be used within the scope of any other application, such as measuring or animation instruments for which an inversion of the contrast of all or part of the displayed data might be useful, aesthetically pleasing or surprising.

Figure 1A:
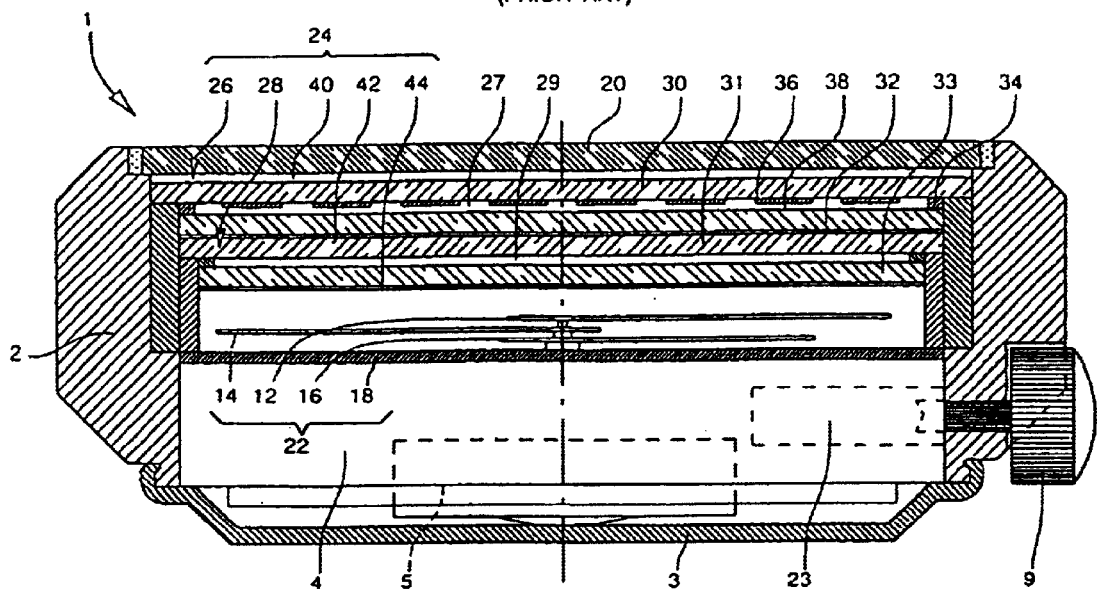
FIG. 1A, already cited, is a cross-section of a wristwatch including a display assembly according to the prior art.

The actual construction of the two superposed display devices inside a wristwatch will not be described any further, given that, in its most general embodiment, it corresponds to what was already described with reference to FIG. 1A, with the exception of intermediate polariser 42 which has been omitted.

In the case of an application to a wristwatch, the first display device will essentially display time related data and the second display device will display time related data complementary to such data or non time related data of sensor systems or processing systems, for example alphanumerical, integrated in the case of said timepiece.

Figure 1B:
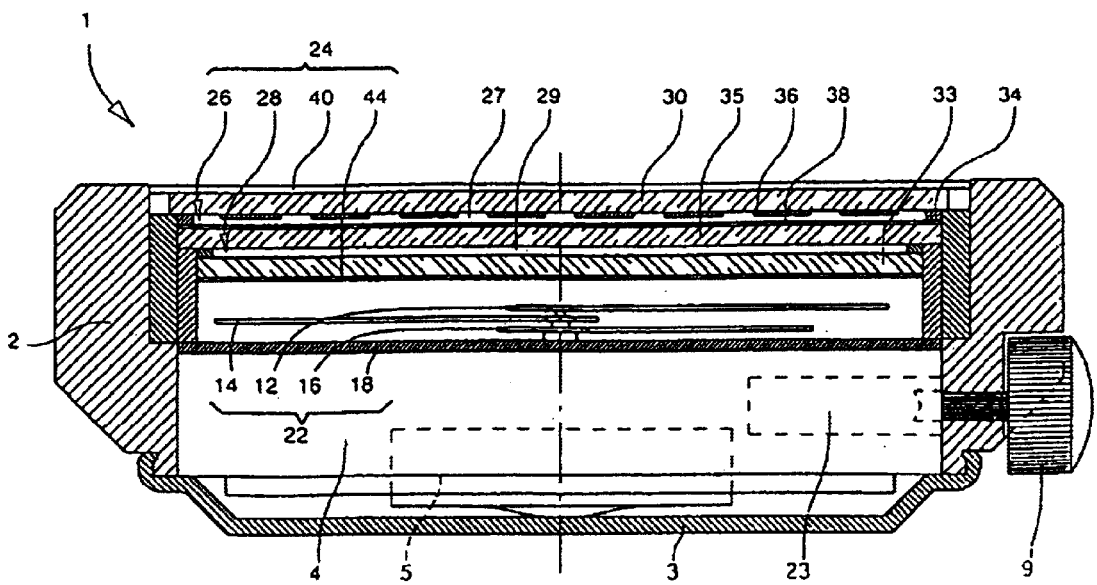
FIG. 1B is a particular embodiment of a display assembly according to the invention, incorporated in a wristwatch.
Figure 2A:
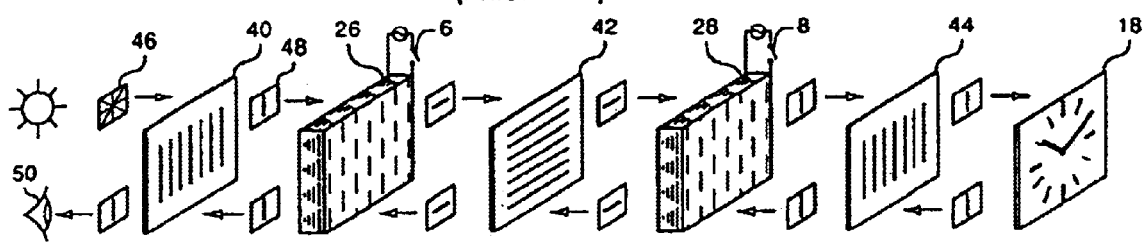
FIGS. 2A and 2B, already cited, are schematic diagrams of the two operating modes disclosed in the prior art.
Figure 2B:
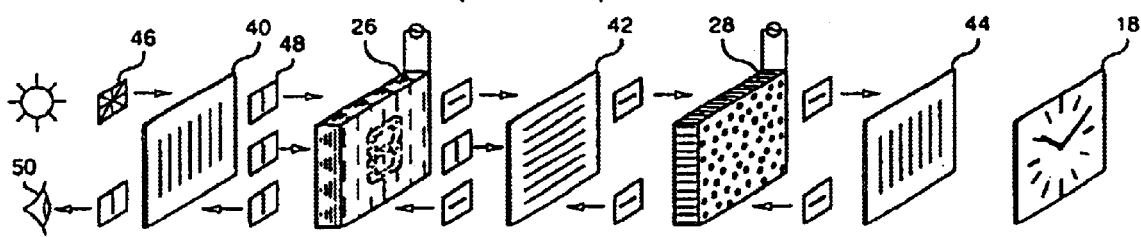
Figure 2C:
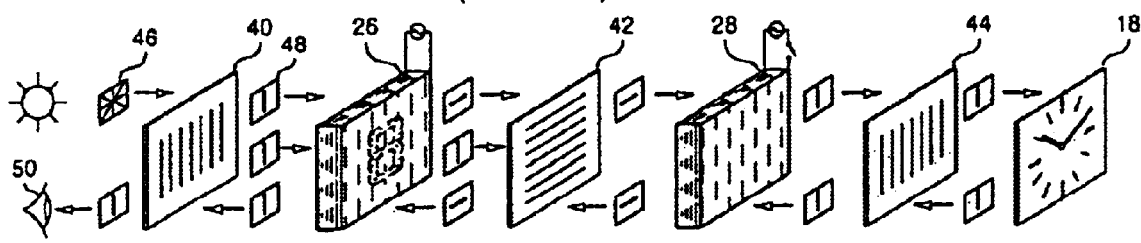
FIG. 2C, already cited, is a schematic diagram of another operating mode which may be envisaged with the display assembly of the prior art.
Figure 3A:
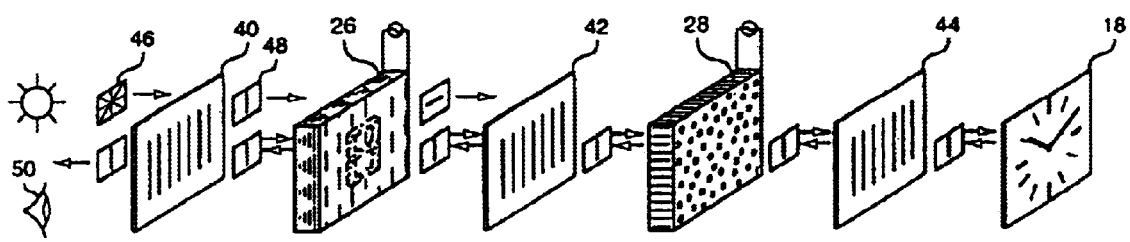
FIGS. 3A, 3B, 4A, 4B, 5A and 5B, already cited, are schematic diagrams of modifications which may be made to the display assembly of the prior art.
Figure 3B:
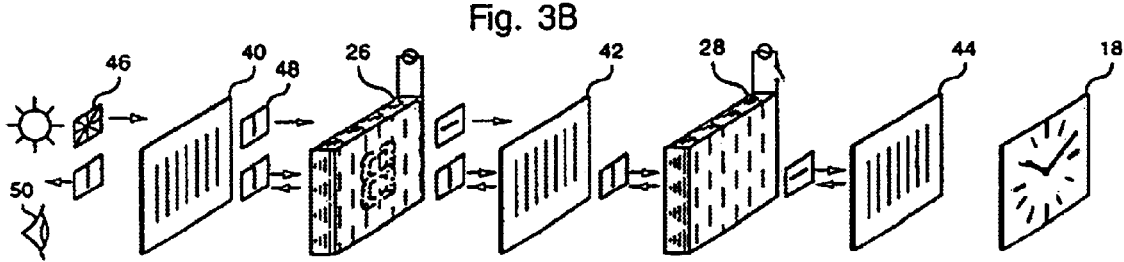
Figure 4A:
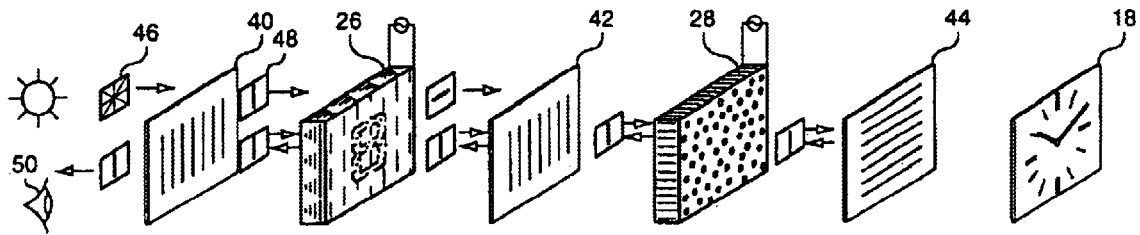
Figure 4B:
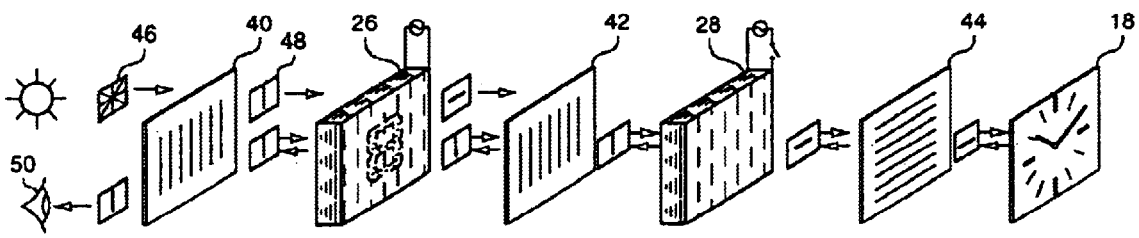
Figure 5A:
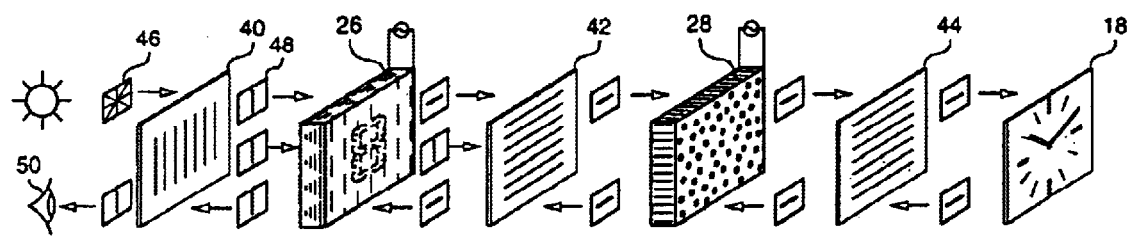
Figure 5B:
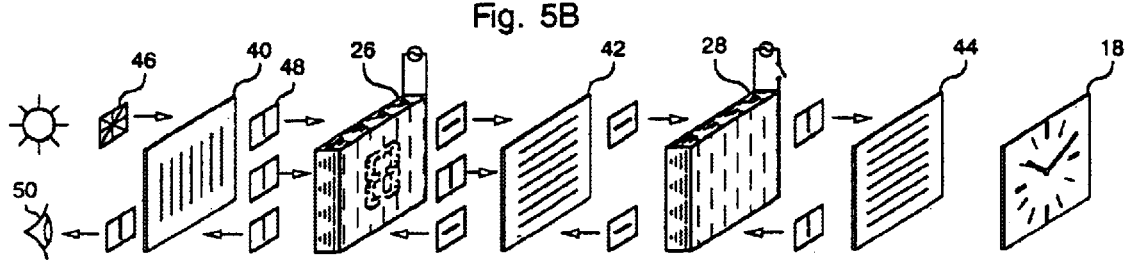

In a particular embodiment shown in FIG. 1B, it can be seen that crystal 20 can be omitted, provided of course that top transparent substrate 30 of cell 26 of the second display device 24 is given sufficient thickness. Given that the construction according to the invention no longer requires intermediate polariser 42, bottom transparent substrate 32 of cell 26 and top transparent substrate 31 of valve 28 can form a single transparent substrate 35 including on its outer faces transparent electrodes respectively for cell 26 and valve 28. Such an arrangement has the advantages of further reducing the parallax effect and increasing the brightness of the assembly given that a polariser, in its passive role (i.e. when the axis of the polarised light is parallel to the axis of polarisation of the polariser), normally involves a loss in brightness of 5 to 8% on each passage of polarised light.

With reference more particularly now to FIGS. 6, 6A to 6D, a display assembly according to the invention is shown, including a first display device 22 of the analogue type having a dark dial and a second display device 24, arranged between first device 22 and a crystal 20 on the side of an observer 50. This second device 24 is formed by a stack including a front absorbent polariser 40 oriented towards the crystal, a twisted nematic liquid crystal cell 26 with positive anisotropy, whose segments can be switched from one state to another (ON/OFF) by means of a switch 6, an optical valve 28 having the same liquid crystals as those of cell 26, or another liquid crystal with positive dielectric anisotropy able to be switched from one state to another (ON/OFF) by means of a switch 8 and a reflective polariser 44 crossed with polariser 40.

Figure 6:
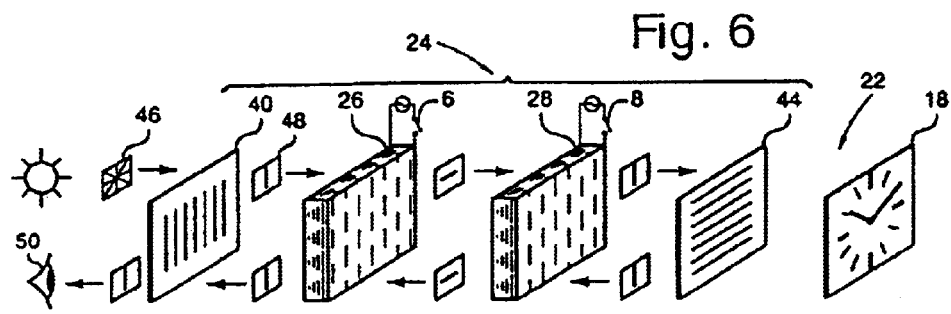
FIGS. 6, 6A to 6E are schematic diagrams of a first embodiment of a display assembly according to the invention.
Figure 6A:
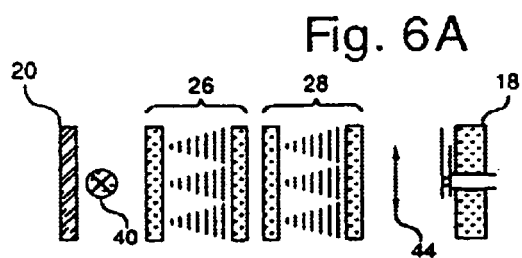
Figure 6A:
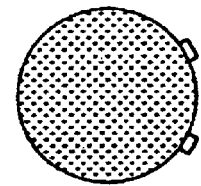

In FIG. 6A, which shows on the left a cross-section of the assembly shown in FIG. 6, and on the right the appearance of the display assembly visible to observer 50, cell 26 and valve 28 are not switched, the OFF-OFF configuration which will be designated hereinafter by the letter A. The polarised light 48 undergoes a first rotation of 90° through cell 26 and a second rotation of 90° through valve 28 so that its axis of polarisation is perpendicular to that of reflective polariser 44: the light is then reflected following an identical return path and first display 22 is hidden by a mirror mask formed by polariser 44 so that no data is displayed.

Figure 6B:
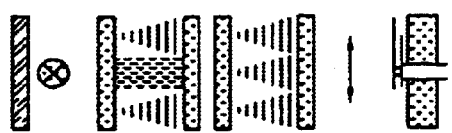
Figure 6B:
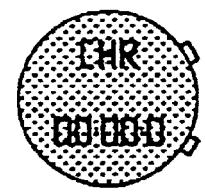

In FIG. 6B, cell 26 is switched (ON) and valve 28 is not switched (OFF), this configuration being designated hereinafter by the letter B. In the zones which do not include addressed segments 36, polarised light 48 follows the same travel as before and a mirrored background is obtained. In the zones where the segments are addressed, represented in the Figure by the central zone, polarised light 48 passes through cell 26 without modification, undergoes a rotation of 90° passing through valve 28, so that since its axis of polarisation is parallel to that of reflective polariser 44, it passes through it without modification to be reflected by dial 18 and to follow an identical return path. The observer thus sees portions of the dark dial through these transparent windows, so that the data provided by cell 26 is shown in a dark colour on a light background with a mirror effect.

Figure 6C:
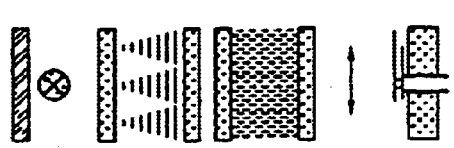
Figure 6C:

In FIG. 6C, cell 26 is not switched (OFF) and valve 28 is switched (ON), a configuration which will be designated hereinafter by the letter C. All of polarised light 48 passes through cell 26 undergoing a rotation of 90°, then passes through valve 28 without modification, so that by having its axis of polarisation parallel to that of the reflective polariser, it passes through it to hit the dial and be reflected by an identical return path to the outward travel: the observer thus only sees the first display device associated with dial 18.

Figure 6D:
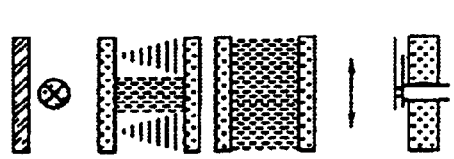
Figure 6D:

In FIG. 6D, the segments of cell 26 and valve 28 are switched (ON-ON), a configuration which will be designated hereinafter by the letter D. The polarised light rays which pass through the assembly in zones which do not have addressed segments allow portions of the dial to be seen, as shown in FIG. 6C, i.e. they provide a dark background. Conversely, in the zones where the segments are addressed, polarised light 48 passes through cell 26 and valve 28 without modification, and arrives at the reflective polariser with a direction of polarisation which is perpendicular to that of said polariser, so that it is reflected following a return path causing the data supplied by the second display to appear in a light colour on a dark background. As is seen passing from switching configuration B to switching configuration D, an inversion of the contrast from dark to light is obtained in the displayed data.

Figure 6E:
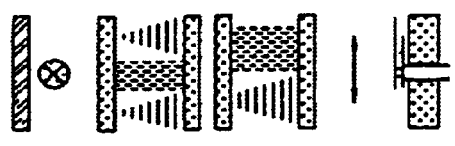
Figure 6E:

FIG. 6E shows a switching configuration, designated hereinafter by the letter E, in which cell 26 is switched (ON) and the valve includes a switched rectangular top surface (ON), causing part of the data to appear in this zone in a light colour on a dark background, and the rest of the surface in the non switched state (OFF) causing the other part of the data to appear in a dark colour on a light background. This switching configuration which allows an inversion of the contrast to be obtained at the same time, for example allows one to differentiate between two varieties of complementary data or data of a different nature.

As can be seen, the different aspects of the display assembly according to the invention, and in particular the contrast inversions, are obtained very simply by switching configurations resulting from positions of switches 6, 8, themselves controlled by control unit 23 and responding to manipulations effected on at least one external control button 9, it being specified that the designer is free to select only certain switching configurations.

In the variant shown in FIGS. 7, 7A to 7E, the construction differs from the preceding one in that the two polarisers 40, 44 are parallel, which has the effect, with respect to FIGS. 6, 6A to 6C, of permuting the switching configurations, on the one hand between the mirror mask and the first display device only, on the other hand between the two contrast inversion states. In configuration A, the first display device is permanently visible, without consuming any energy, while masking by a mirror mask is obtained with configuration C. In configuration B, the second display appears in a light colour on a dark background while the inversion of the contrast is obtained with configuration D. It will be observed that the appearance of the display assembly with configuration E is naturally unchanged.

With reference now to the embodiment shown in FIGS. 8, 8A to 8E, it can be seen that the construction proposed arises from the same principle as before, but differs therefrom in that dial 18 of the first display device is in a light colour and back polariser 44 is an absorbent linear polariser, crossed with front polariser 40 in this embodiment. In switching configuration A (OFF-OFF) shown in FIGS. 8 and 8A, polarised light 48 undergoes a rotation of 90° passing through cell 26, then a second rotation of 90° passing through valve 28 so that it hits polariser 44 with its axis of polarisation perpendicular to that of absorbent polariser 44: it is thus totally absorbed masking the first display with a black mask. By following the travel of the light rays as was explained in the preceding examples, it can be seen that configuration B allows just the second display device to be in a light colour on a dark background, configuration C just the first display device, configuration D allows the first display device to have an inversion of the contrast with respect to that obtained with configuration B, and configuration E allows two parts of the data supplied by the second display device to be simultaneously displayed with an inversion of the contrast.

Figure 7:
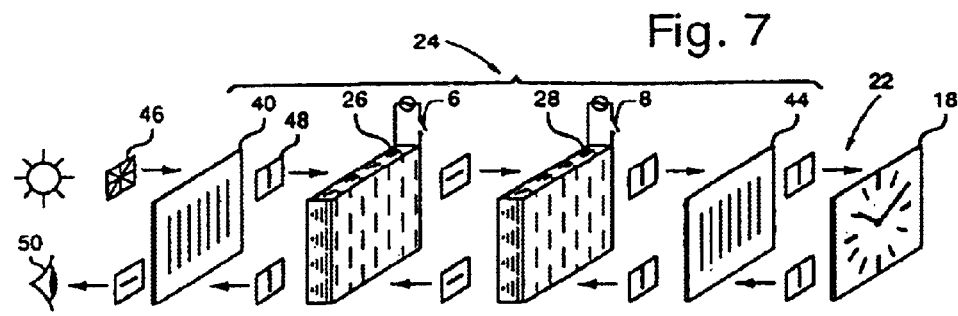
FIGS. 7, 7A to 7E are schematic diagrams of a variant of the first embodiment.
Figure 7A:
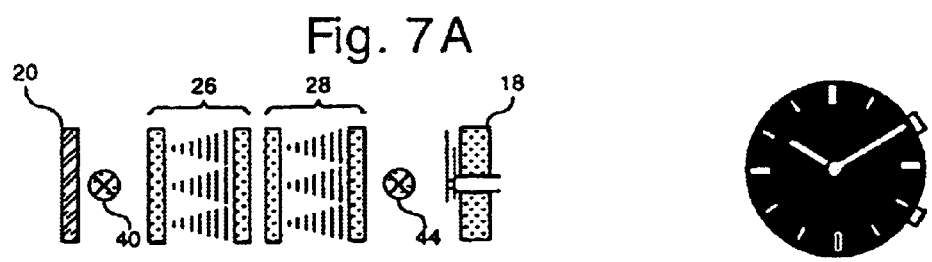
Figure 7B:
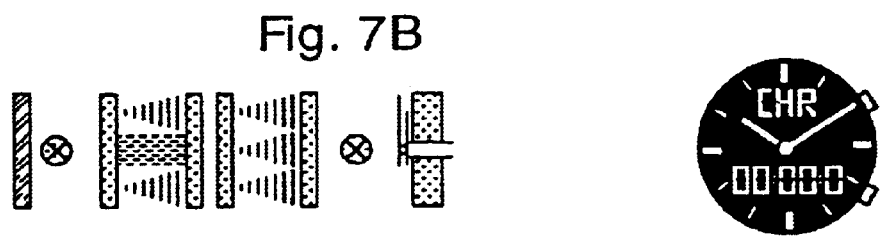
Figure 7C:
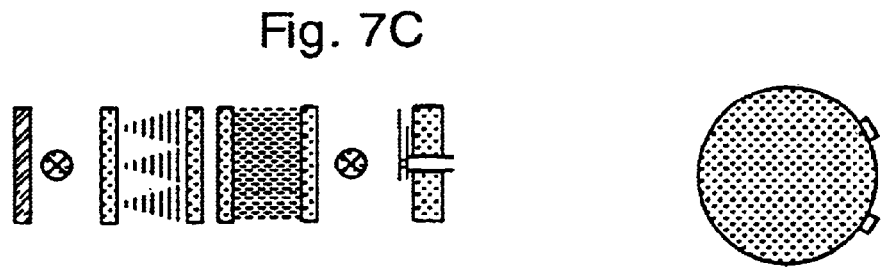
Figure 7D:
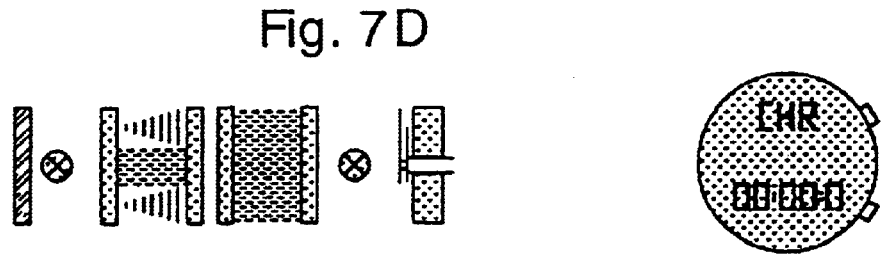
Figure 7E:
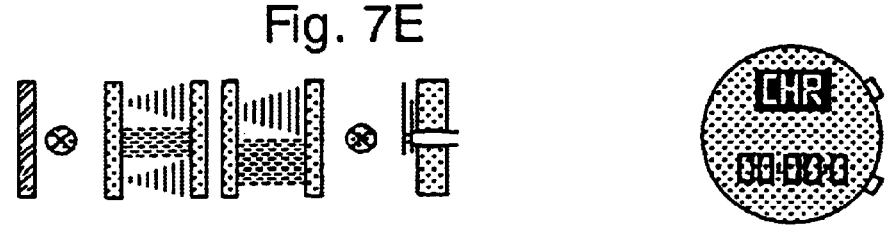
Figure 8:
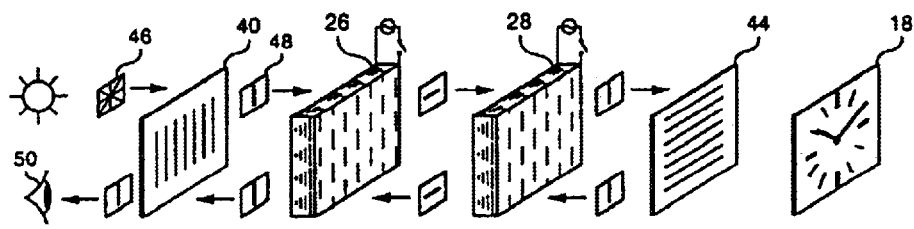
FIGS. 8, 8A to 8E are schematic diagrams of a second embodiment of a display device according to the invention.
Figure 8A:
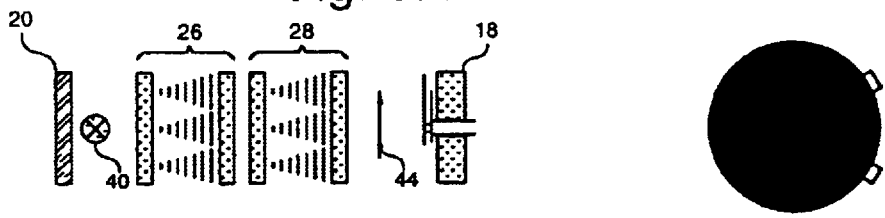
Figure 8B:
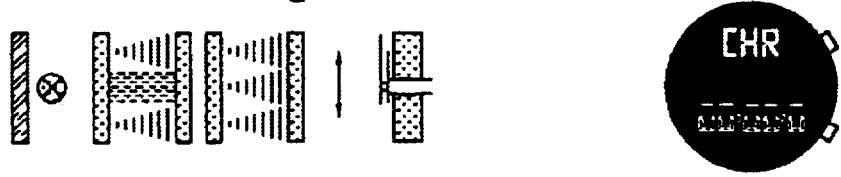
Figure 8C:
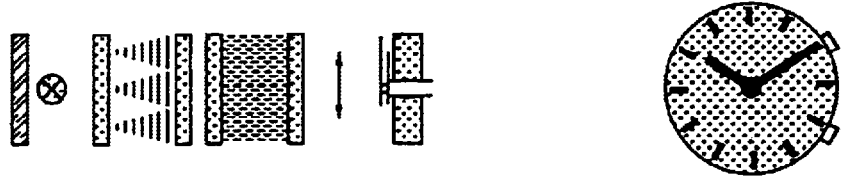
Figure 8D:
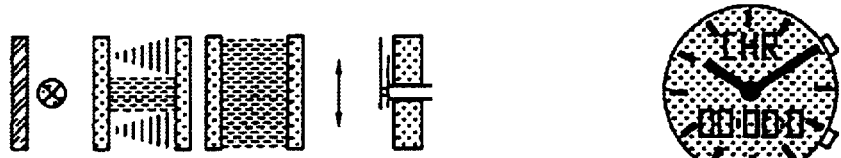
Figure 8E:
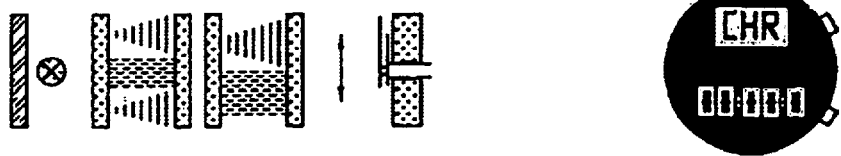
Figure 9:
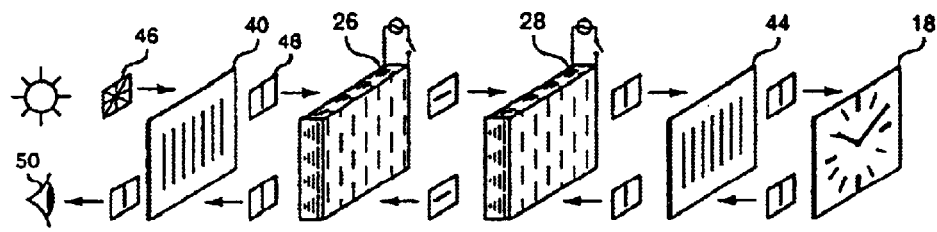
FIGS. 9, 9A to 9E are schematic diagrams of a variant of the second embodiment.
Figure 9A:
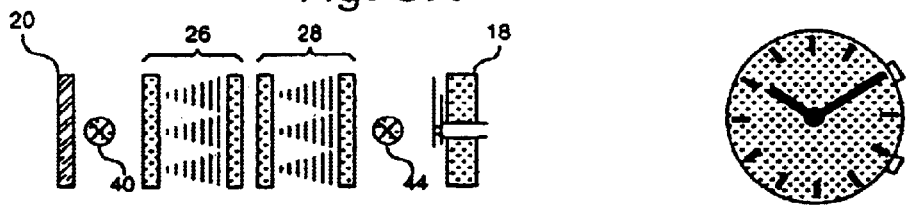
Figure 9B:
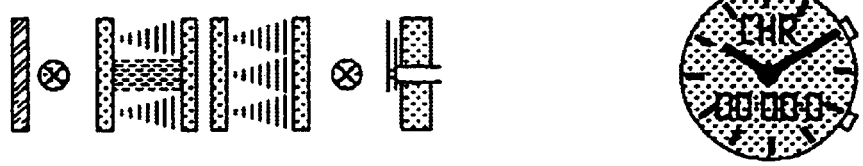
Figure 9C:
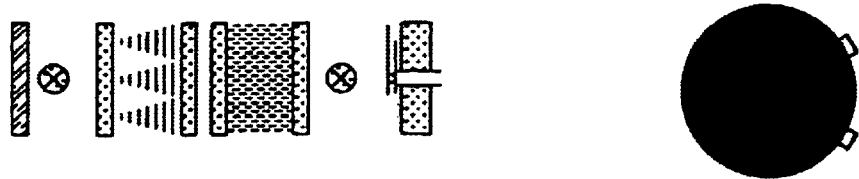
Figure 9D:
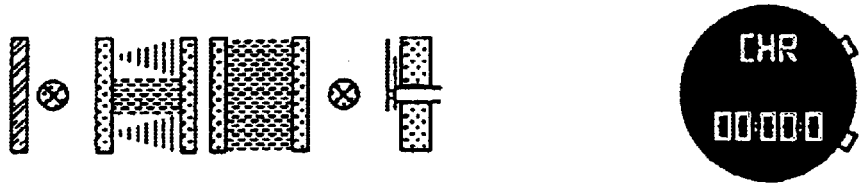
Figure 9E:
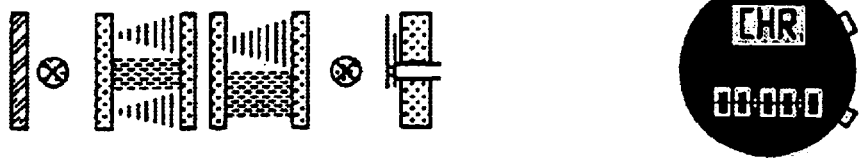

In the variant shown in FIGS. 9, 9A to 9E, the construction differs from that which has just been described with reference to FIGS. 8, 8A to 8D, in that back polariser 44 is parallel to the front polariser, generating the same effect as explained for the variant described in FIG. 7 with respect to FIG. 6. Thus, in configuration A, observer 50 sees only the first display device, in configuration B, he sees the second display device in a dark colour on a light background, in configuration C, he sees only a black mask, in configuration D he sees only the second display device in a light colour on a dark background, i.e. with an inversion of the contrast with respect to that observed with configuration B, and in configuration E, he sees two parts of the data supplied by the second display device with contrast inversions.

In the examples which have just been described with reference to FIGS. 6 to 6E, liquid crystals 27, 29 filling cell 26 and valve 28 both had positive anisotropy. If cell 26 and valve 28 are now filled with liquid crystals with negative anisotropy with a homeotropic alignment with a potential rotation of 90°, exactly the same visual appearance will be obtained with exactly the same switching configurations. If there is the same construction as in FIG. 6, in a switching configuration A (OFF-OFF), it can be seen that the vertically polarised light 48 passes through cell 36 and valve 28 without modification to hit reflective polariser 44 perpendicular to its axis of polarisation and that it is reflected following an identical return path: the observer then sees a mirrored background as was the case shown in FIG. 6A. The same will be true with the other switching configurations which will allow the contrast inversion observed between FIGS. 6B and 6D to be obtained, as well as with the other constructions corresponding to FIGS. 7 to 9.

Figure 10:
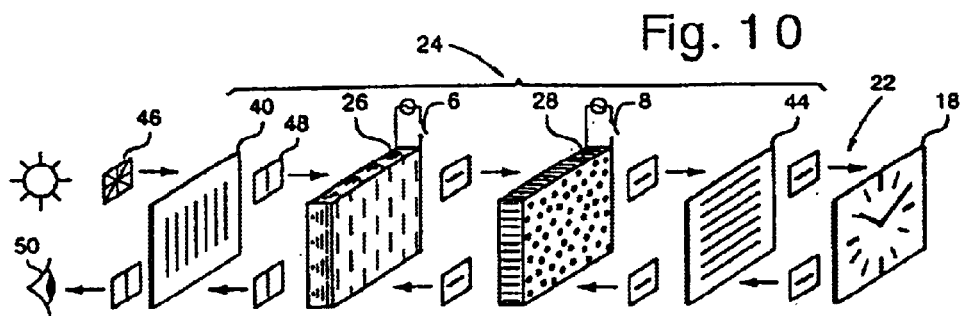
FIGS. 10, 10A to 10E are schematic diagrams of another implementation mode of the invention.
Figure 10A:
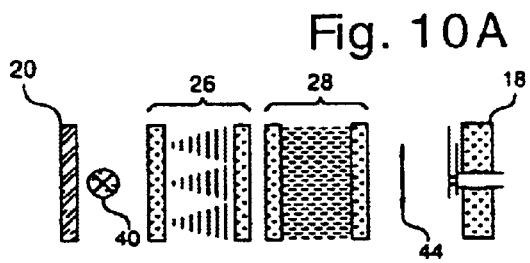
Figure 10A:
Figure 10B:
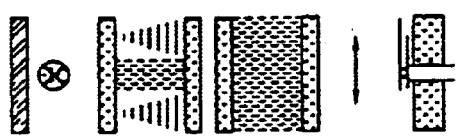
Figure 10B:
Figure 10C:
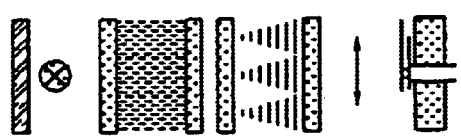
Figure 10C:
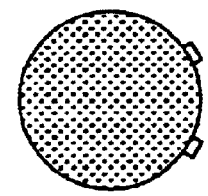
Figure 10D:
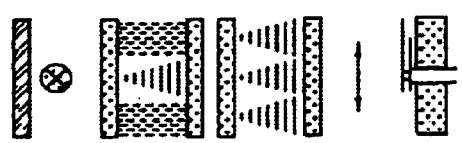
Figure 10D:
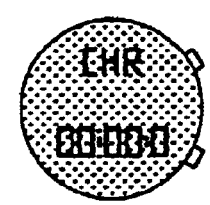
Figure 10E:
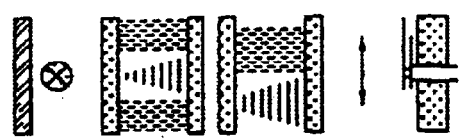
Figure 10E:
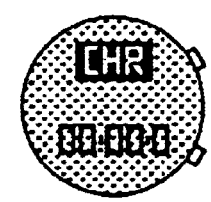

FIGS. 10 and 10A to 10E show a display assembly according to the invention the construction of which is the same as that of FIG. 6, but wherein cell 26 has been filled with liquid crystals 27 of the twisted nematic type with negative anisotropy and valve 28 with liquid crystals 29 of the twisted nematic type with positive anisotropy. In switching configuration A (OFF-OFF), it can be seen in FIG. 10A that polarised light 48 undergoes a rotation of 90° passing through cell 26, that its orientation is not modified passing through valve 28, and since its axis of polarisation is parallel to that of reflective polariser 44, passes through it while being reflected by the dial to follow an identical return path. Observer 50 thus sees the first display device as shown in FIG. 10A. Following the travel of the polarised light in the same way, observer 50 sees the second display device in a light colour on a dark background in switching configuration B (FIG. 10B), a mirrored background in switching configuration C (FIG. 10C), the second display device with a contrast inversion in a dark colour on a light background in switching configuration D (FIG. 10D) and a double contrast inversion in switching configuration E (FIG. 10E). It is to be observed then that with the same switching configurations, the same visual aspects are obtained as can be observed in FIGS. 7A to 7E. It one now uses, with the cell and valve filled as hereinbefore, the construction corresponding to FIG. 7, it is easy to see that conversely, still with the identical switching configurations, the visual appearance shown in FIGS. 6A to 6E is obtained. Again, still with the cell and valve filled in the same way, the construction of FIG. 8 will give the visual appearances shown in FIGS. 9A to 9E, and conversely the construction of FIG. 9 will give the visual appearances shown in FIGS. 8A to 8E. It is to be noted finally that by permuting the order of filling of the liquid crystals in the cell, and the valve, the appearances which have just been described with reference to FIG. 10 and following are unchanged.

Thus, whatever the embodiments and variants, the display assembly according to the invention always allows an inversion of the contrast to be obtained in the data supplied by the second display device, simply by taking care to associate a first display device having a dark dial with a second display device having a reflective back polariser, and conversely a first display device having a light coloured dial with a second display device having an absorbent back polariser. It is clear that the notion of "light" or "dark" colouring for the dial depends on the level of contrast which one wishes to obtain.

In the examples which have just been described, the first display device was shown, by way of example, as being of the analogue type. Without departing from the scope of the invention, said first display device may also be of the digital type or mixed analogue-digital type, and further include at least one decorative element. Likewise, without departing from the scope of the present invention, the digital part of the first display device may have a comparable structure to that of the second display device thereby increasing the number of effects able to be obtained with a single display assembly depending on appropriate configurations of the switched or non switched state of the two cells and two valves.

Without departing from the scope of the invention, it is possible to fill cell 26 and valve 28 with compositions acting on the polarised light different from the liquid crystal family which has just been described, allowing for example either the second display device to have a higher multiplexing level, or a different control voltage to be obtained for cell 26 and valve 28 so as to lead to a simplification of control circuit 23, or to provide a memory effect. By way of non limiting illustrative example, twisted nematic (TN) liquid crystals can be used for display cell 26 and in plane switching (IPS) or cholesteric texture (CT) liquid crystals for valve 28, which provides a memory effect.

Other variants may also be envisaged by those skilled in the art without departing form the scope of the present invention.

What is claimed is:

1. A display assembly with two superposed contrast inversion display devices, the assembly including:

a first display device; and a second active display device having a double structure, one structure being formed by a first contrast inversion display device provided by a twisted nematic liquid crystal dot matrix display cell or by a digit twisted nematic liquid crystal display cell, the liquid crystals of the one structure being confined in a space delimited by two transparent substrates and having two switching states, and the other structure being formed by a second contrast inversion display device provided by a twisted nematic liquid crystal optical valve, the liquid crystals of the other structure being confined in a space delimited by two transparent substrates and having at least two switching states and control means allowing an appropriate voltage to be selectively applied to the display cell and optionally to all or part of the valve to cause each liquid crystal to switch from one state to another, wherein the second active display includes only two polarisers such that a first absorbent or reflective front polariser is arranged at the front of the display cell and in that a second back polariser, crossed with the front polariser or parallel thereto, is arranged at the back of the valve so that when the display cell is switched to display at least one item of data, the total or partial switching of the valve, from one state to another, inverts the contrast of the data displayed from a light appearance to a dark appearance or vice versa, wherein the first display device has a dark shade and the back polariser is a reflective polariser, and wherein the first contrast inversion display device and the second contrast inversion display device are superposed; wherein the back polariser is crossed with the front polariser, the display cell and the optical valve both have positive anisotropy or both have negative anisotropy, and wherein the at least two switching states comprise:

a first switching state wherein the display cell is switched OFF and the optical valve is switched OFF, and the first display device is hidden by a mirror mask;

a second switching state wherein the display cell is switched ON and the optical valve is switched OFF so a portion of the first display device is seen through a transparent window and the display cell shows data in the dark shade on a light background;

a third switching state wherein the display cell is switched OFF and the optical valve is switched ON so that only the first display device is seen; and a fourth switching state wherein the display cell is switched ON and the optical valve is switched ON so the first display device is seen and the display cell shows data in a light color on a dark background.

2. A display assembly according to claim 1, wherein the switching of the valve from one state to another also allows either the first display only to be made visible, or for the first display to be totally hidden by a mirror mask or by a black mask when the display cell is not switched.

3. A display assembly according to claim 1, wherein the first display device is selected from among an analogue device, a digital device, a combination of an analogue device and a digital device, and a decorative element.

4. A timepiece including a case closed by a crystal and a back cover in which a clockwork movement associated with at least one display device is housed, characterized in that said display device is formed by a display assembly according to claim 1, said first display device essentially displaying time related data and said second display device displaying time related data complementary to the preceding data or non time related data of sensor systems, or alphanumerical processing systems, integrated in the case of the timepiece.

5. A timepiece according to claim 4, wherein said first display device includes a dial above which move an hour hand, a minute hand and a second hand.

6. A timepiece according to claim 4, wherein the second display is combined with the crystal.

7. A display assembly with two superposed contrast inversion display devices, the display assembly including:

a first display device; and a second active display device having a double structure, one structure being formed by a first contrast inversion display device provided by a twisted nematic liquid crystal dot matrix display cell or by a twisted nematic digit liquid crystal display cell, the liquid crystals of the one structure being confined in a space delimited by two transparent substrates and having two switching states, and the other structure being formed by a second contrast inversion display device provided by a twisted nematic liquid crystal optical valve, the liquid crystals of the other structure being confined in a space delimited by two transparent substrates and having at least two switching states and control means allowing an appropriate voltage to be selectively applied to the display cell and optionally to all or part of the valve to cause each liquid crystal to switch from one state to another, wherein the second active display includes only two polarisers such that a first absorbent or reflective front polariser is arranged at the front of the display cell and in that a second back polariser, crossed with the front polariser or parallel thereto, is arranged at the back of the valve so that when the display cell is switched to display at least one item of data, the total or partial switching of the valve, from one state to another, inverts the contrast of the data displayed from a light appearance to a dark appearance or vice versa, wherein the first display device has a light shade and the back polariser is an absorbent polariser, and wherein the first contrast inversion display device and the second contrast inversion display device are superposed; wherein the back polariser is crossed with the front polariser, the display cell and the optical valve both have positive anisotropy or both have negative anisotropy, and wherein the at least two switching states comprise:

a first switching state wherein the display cell is switched OFF and the optical valve is switched OFF, and the first display device is hidden by a black mask:

a second switching state wherein the display cell is switched ON and the optical valve is switched OFF so a portion of the first display device is seen through a transparent window and the display cell shows data in the light shade on a dark background;

a third switching state wherein the display cell is switched OFF and the optical valve is switched ON so that only the first display device is seen; and a fourth switching state wherein the display cell is switched ON and the optical valve is switched ON so the first display device is seen and the display cell shows data in a dark color on a light background.

8. A display assembly according to claim 7, wherein the switching of the valve from one state to another also allows either the first display only to be made visible, or for the first display to be totally hidden by a mirror mask or by a black mask when the display cell is not switched.

9. A display assembly according to claim 7, wherein the first display device is selected from among an analogue device, a digital device, a combination of an analogue device and a digital device, and a decorative element.

10. A display assembly with two superposed contrast inversion display devices, the assembly including:

a first display device; and a second active display device having a double structure, one structure being formed by a first contrast inversion display device provided by a twisted nematic liquid crystal dot matrix display cell or by a digit twisted nematic liquid crystal display cell, the liquid crystals of the one structure being confined in a space delimited by two transparent substrates and having two switching states, and the other structure being formed by a second contrast inversion display device provided by a twisted nematic liquid crystal optical valve, the liquid crystals of the other structure being confined in a space delimited by two transparent substrates and having at least two switching states and control means allowing an appropriate voltage to be selectively applied to the display cell and optionally to all or part of the valve to cause each liquid crystal to switch from one state to another, wherein the second active display includes only two polarisers such that a first absorbent or reflective front polariser is arranged at the front of the display cell and in that a second back polariser, crossed with the front polariser or parallel thereto, is arranged at the back of the valve so that when the display cell is switched to display at least one item of data, the total or partial switching of the valve, from one state to another, inverts the contrast of the data displayed from a light appearance to a dark appearance or vice versa, wherein the first display device has a dark shade and the back polariser is a reflective polariser, and wherein the first contrast inversion display device and the second contrast inversion display device are superposed; wherein the back polariser is parallel to the front polariser, the display cell and the optical valve both have positive anisotropy or both have negative anisotropy, and wherein the at least two switching states comprise:

a first switching state wherein the display cell is switched OFF and the optical valve is switched OFF so that only the first display device is seen;

a second switching state wherein the display cell is switched ON and the optical valve is switched OFF so the first display device is seen and the display cell shows data in a light color on a dark background;

a third switching state wherein the display cell is switched OFF and the optical valve is switched ON, and the first display device is hidden by a mirror mask; and a fourth switching state wherein the display cell is switched ON and the optical valve is switched ON so a portion of the first display device is seen through a transparent window and the display cell shows data in the dark shade on a light background.

11. A display assembly with two superposed contrast inversion display devices, the display assembly including:

a first display device; and a second active display device having a double structure, one structure being formed by a first contrast inversion display device provided by a twisted nematic liquid crystal dot matrix display cell or by a twisted nematic digit liquid crystal display cell, the liquid crystals of the one structure being confined in a space delimited by two transparent substrates and having two switching states, and the other structure being formed by a second contrast inversion display device provided by a twisted nematic liquid crystal optical valve, the liquid crystals of the other structure being confined in a space delimited by two transparent substrates and having at least two switching states and control means allowing an appropriate voltage to be selectively applied to the display cell and optionally to all or part of the valve to cause each liquid crystal to switch from one state to another, wherein the second active display includes only two polarisers such that a first absorbent or reflective front polariser is arranged at the front of the display cell and in that a second back polariser, crossed with the front polariser or parallel thereto, is arranged at the back of the valve so that when the display cell is switched to display at least one item of data, the total or partial switching of the valve, from one state to another, inverts the contrast of the data displayed from a light appearance to a dark appearance or vice versa, wherein the first display device has a light shade and the back polariser is an absorbent polariser, and wherein the first contrast inversion display device and the second contrast inversion display device are superposed; wherein the back polariser is parallel to the front polariser, the display cell and the optical valve both have positive anisotropy or both have negative anisotropy, and wherein the at least two switching states comprise:

a first switching state wherein the display cell is switched OFF and the optical valve is switched OFF so that only the first display device is seen;

a second switching state wherein the display cell is switched ON and the optical valve is switched OFF so the first display device is seen and the display cell shows data in a dark color on a light background;

a third switching state wherein the display cell is switched OFF and the optical valve is switched ON, and the first display device is hidden by a black mask; and a fourth switching state wherein the display cell is switched ON and the optical valve is switched ON so a portion of the first display device is seen through a transparent window and the display cell shows data in the light shade on a dark background.

12. A display assembly with two superposed contrast inversion display devices, the assembly including:

a first display device; and a second active display device having a double structure, one structure being formed by a first contrast inversion display device provided by a twisted nematic liquid crystal dot matrix display cell or by a digit twisted nematic liquid crystal display cell, the liquid crystals of the one structure being confined in a space delimited by two transparent substrates and having two switching states, and the other structure being formed by a second contrast inversion display device provided by a twisted nematic liquid crystal optical valve, the liquid crystals of the other structure being confined in a space delimited by two transparent substrates and having at least two switching states and control means allowing an appropriate voltage to be selectively applied to the display cell and optionally to all or part of the valve to cause each liquid crystal to switch from one state to another, wherein the second active display includes only two polarisers such that a first absorbent or reflective front polariser is arranged at the front of the display cell and in that a second back polariser, crossed with the front polariser or parallel thereto, is arranged at the back of the valve so that when the display cell is switched to display at least one item of data, the total or partial switching of the valve, from one state to another, inverts the contrast of the data displayed from a light appearance to a dark appearance or vice versa, wherein the first display device has a dark shade and the back polariser is a reflective polariser, and wherein the first contrast inversion display device and the second contrast inversion display device are superposed; wherein the back polariser is crossed with the front polariser, the display cell has negative anisotropy and the optical valve has positive anisotropy, and wherein the at least two switching states comprise:

a first switching state wherein the display cell is switched OFF and the optical valve is switched OFF so that only the first display device is seen;

a second switching state wherein the display cell is switched ON and the optical valve is switched OFF so the first display device is seen and the display cell shows data in a light color on a dark background;

a third switching state wherein the display cell is switched OFF and the optical valve is switched ON, and the first display device is hidden by a mirror mask; and a fourth switching state wherein the display cell is switched ON and the optical valve is switched ON so a portion of the first display device is seen through a transparent window and the display cell shows data in the dark shade on a light background.

* * * * *